United States Patent [19]
Knittel

[11] Patent Number: 5,959,631
[45] Date of Patent: Sep. 28, 1999

[54] HARDWARE AND SOFTWARE FOR THE VISUALIZATION OF THREE-DIMENSIONAL DATA SETS

[75] Inventor: Guenter Knittel, Mountain View, Calif.

[73] Assignee: Hewlett-Packard Company, Palo Alto, Calif.

[21] Appl. No.: 08/919,630

[22] Filed: Aug. 28, 1997

Related U.S. Application Data

[60] Provisional application No. 60/024,763, Aug. 28, 1996.
[51] Int. Cl.[6] .................................................. G06T 17/40
[52] U.S. Cl. ............................................................ 345/420
[58] Field of Search .................................... 345/419, 420, 345/421

[56] References Cited

U.S. PATENT DOCUMENTS

| | | | |
|---|---|---|---|
| 4,809,065 | 2/1989 | Harris et al. | 345/428 |
| 5,793,371 | 8/1998 | Deering | 345/420 |
| 5,796,400 | 8/1998 | Atkinson et al. | 345/420 |

*Primary Examiner*—Phu K. Nguyen
*Assistant Examiner*—Cliff N. Vo

[57] ABSTRACT

A method and system for the visualization of three-dimensional data sets. The data set is compressed using blockwise two-level (one bit) quantization. The compressed data is stored on a storage medium and a visualization algorithm is applied to the compressed data set. The compression operation of one of said blocks results in a bit string, herein denoted a code element, which contains one decision bit for each data element defining the level assigned to a data element, and the two levels for a block. Data elements, for example, represent brightness values or colors, wherein the resulting colors of the entire compressed data set are again quantized to a smaller number of bits, e.g. 8 bits.

20 Claims, 16 Drawing Sheets

FIG. 8A
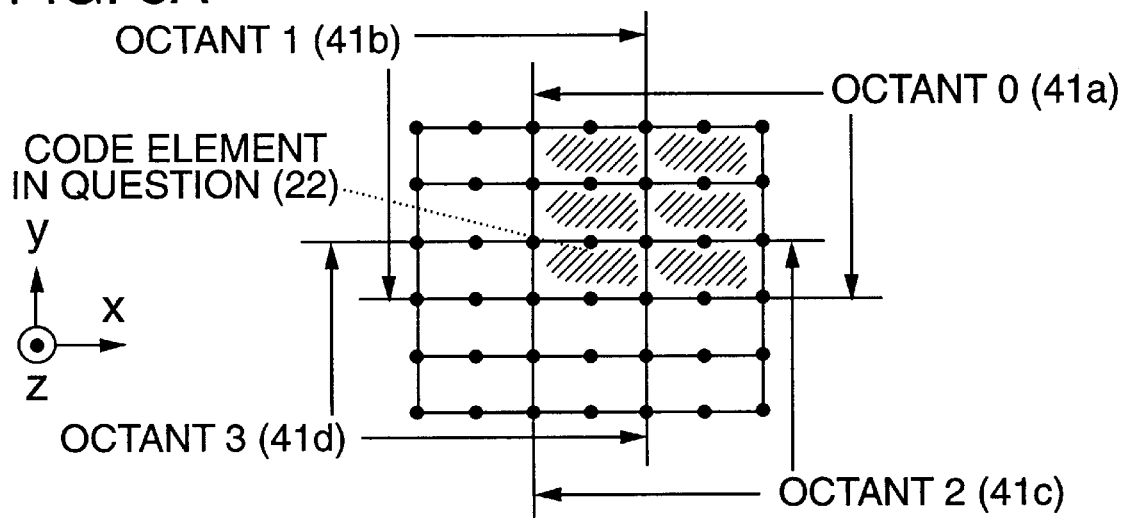
FIG. 8B
| 31 | | | | | | | | | | | | | | | 16 |
|---|---|---|---|---|---|---|---|---|---|---|---|---|---|---|---|
| x | x | x | x | x | x | x | x | x | x | x | x | x | x | 1 | 0 |
| $E_{15}$ | $E_{14}$ | $E_{13}$ | $E_{12}$ | $E_{11}$ | $E_{10}$ | $E_9$ | $E_8$ | $E_7$ | $E_6$ | $E_5$ | $E_4$ | $E_3$ | $E_2$ | $E_1$ | $E_0$ |
FIG. 9
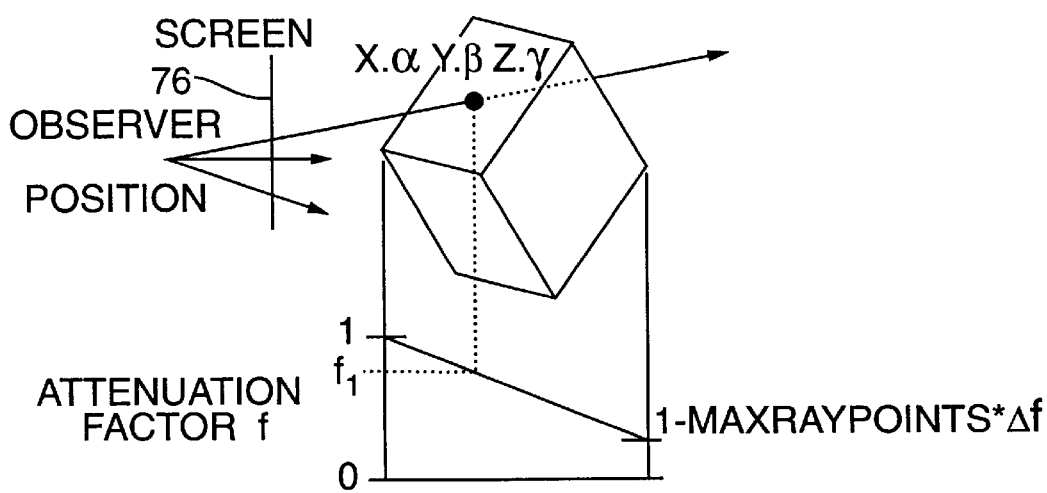

HARDWARE AND SOFTWARE FOR THE VISUALIZATION OF THREE-DIMENSIONAL DATA SETS

CROSS REFERENCE TO RELATED APPLICATIONS

This application's priority is based upon Provisional Application No. 60/024,763 filed on Aug. 28, 1996.

FIELD OF THE INVENTION

This invention relates to three-dimensional image compression, decompression and rendering and more particularly, to a system and method in which encoding a data array into a plurality of code elements of this invention provides for a rendering operation with real-time access to material tag bits and interpolated values.

BACKGROUND OF THE INVENTION

Real-time volume rendering of three-dimensional images on a two-dimensional monitor requires a high computing power so that it can only be achieved on supercomputers, high-end workstations, workstation networks or special-purpose hardware. Such rendering would include processing data to view a three-dimensional image from a first angle and then viewing that same image from a second angle to provide stereoscopic viewing. Such rendering would also include viewing different material characteristics sequentially. The high computing requirements stem from the algorithmic complexity of volume visualization and the sheer amount of data to be processed. The visualization of volume data sets typically involves the segmentation, or classification of structures of interest, and their meaningful display on the screen. For example, in a raycasting pipeline, this process can easily turn into 100 operations per raypoint, giving 16GOPS for $256^3$ data sets to be rendered at 10 Hz assuming one raypoint per data element on average. Depending on the chosen algorithm and the machine architecture, the needed memory bandwidth can also reach the GByte/s-range.

However, most potential users lack a supercomputer or a high-end workstation. Workstation networks seldom deliver the expected speed due to a limited interconnection bandwidth or heavy loads by other users. Current academic and commercial designs tend to be large, massively parallel architectures (see for example references IX, XII, XIV) and, thus, tend to be very expensive as well.

Although highly desirable in general, interactive classification is not needed in a large number of applications, e.g., when the materials of the data set are well-known, or when automatic segmentation is not reliable enough, and must therefore be done manually by human specialists (for example, in medical diagnosis).

Classification can be considered a preprocessing step, performed once before a large number of views are produced. For a comprehensive understanding of the data set, however, a number of requirements should be satisfied. First, preferably the users should be placed into a virtual environment, where they can step right through the data set to gain the maximum insight. Second, the system must preserve the three-dimensional nature of the data, provide perspective views and retain the depth information. Next, if the data set can be classified into different materials, it should be possible to display either one of them or any combination translucently without performing a re-classification. Finally, the system must provide high rendering speed and high image quality. However, for a broad acceptance on the market, a volume rendering accelerator should not increase the price of a graphics workstation or even a PC significantly.

It is therefore an object of this invention to make the benefits of volume rendering available to a wide audience (e.g., in medical education) and to reduce the costs of a volume visualization system.

SUMMARY OF THE INVENTION

To fulfill these contradictory requirements, this invention is based on a very simple data encoding scheme, which is discussed in detail below. The rendering method and system of this invention is also discussed below. Additionally, below, the underlying technologies (the PCI-bus and FPGAs) are introduced, respectively. Moreover, implementation issues are discussed and image quality and expected rendering performance are illustrated.

Briefly, this invention provides a method for the visualization of three-dimensional data sets including compressing the data set using blockwise two-level (one bit) quantization, storing compressed data set on a storage medium and applying a visualization algorithm to the compressed data set. The three-dimensional data set includes data elements, which represent numerical values at the grid points of a three-dimensional rectangular grid. A data set can be divided into cubic or cuboid blocks (rectangular solids) having eight or more of said data elements and can be compressed in a space filling way, such that neighboring blocks share either a face, an edge or a corner.

The compression operation of one of said blocks results in a bit string, herein denoted a code element, which contains 1 decision bit for each data element defining the level assigned to a data element, and the two levels for a block. Data elements, for example, represent brightness values or colors, wherein the resulting colors of the entire compressed data set are again quantized to a smaller number of bits, e.g., 8 bits.

The visualization algorithm used in conjunction with the compression system and method of this invention is raycasting. This visualization method includes defining a viewing ray through each pixel on a virtual screen, resampling said compressed data set at discrete raypoints on the viewing ray where it passes through the compressed data set, assigning a brightness value or color to said raypoints according to the resampled value of said compressed data set at the location of said raypoints, and calculating the brightness or color of said pixel from said brightness values or colors of all raypoints of the viewing ray passing through the pixel. Raycasting can be carried out in real time using dedicated arithmetic units.

Preferably, the code elements further contain information about different classes of the data elements within the associated block. Moreover, the assignment of brightness values or colors to ray-points can be modified by classes of data elements. Additionally, since code elements further contain information about the neighborhood of blocks, the raycasting operation can be modified such that empty space within a compressed data set is skipped using information about the neighborhood stored in a code elements. Additionally, modified raycasting can be carried out in real time using dedicated arithmetic units.

Structurally, an apparatus according to this invention can include dedicated arithmetic units and memory units for temporary storage of code elements. The memory units additionally store for each code element a unique address tag of the associated block. Memory units are addressed using the coordinate of the raypoint under consideration relative to the one-dimensional coordinate system of the ray under consideration. Moreover, the memory addresses are calculated as the Manhattan Distance of the block containing the raypoint under consideration relative to the block closest to the observer.

A comparator can be further included for comparing an address tag of the code element addressed by the Manhattan Distance of the block containing the raypoint under consideration with the unique address tag of that block. This invention further enables for reading said selected code element out of said memory units in case of address tag match, or writing a code element together with a unique address tag into the memory after fetching it from the storage media in case of address tag mismatch. Data storage media stores instructions for carrying out at least one of the operations described herein.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 8A is a two-dimensional illustration of overlapping neighborhood regions used to examine empty space around a given voxel block;

FIG. 8B represents an example of a redefined code element including distance coding for the example of FIG. 8A;

FIG. 9 is a perspective illustration of linear depth-cueing used in conjunction with the perspective raycasting algorithm;

DETAILED DESCRIPTION OF THE INVENTION

This invention is a new method and system, including software and hardware for the visualization of volume data sets, also known as volume rendering, and its hardware implementation as a volume rendering co-processor for PCI-based systems. It operates on classified and shaded data sets which have been coded and compressed using Redundant Block Compression (RBC), a technique originating from 2D-imaging and extended to 3D. This specific encoding scheme reduces drastically the required data traffic between the volume memory and the processing units. Thus, the volume data set can be placed into the main memory of the host, eliminating the need of a separate volume memory. Furthermore, the tri-linear interpolation needed for perspective raycasting is very much simplified for RBC-transformed data sets. All in all, these techniques allow a volume rendering accelerator to be implemented as a single-chip co-processor, or as an FPGA-based prototype for monochrome data sets as presented in this disclosure. Although using a lossy compression scheme, image quality is still high, and expected frame rates are between 2 and 5 Hz for typical data sets of 2563 voxels.

Processing Preparation

Generally, the method and system for compression and rendering of this invention are described below. However, prior to compression, processing starts with the classification of the data set. Such classification includes, for example, in human physiology, bones, tendons, muscles and epidural layers. The voxels (which may be loosely defined as a three-dimensional counter-part to two-dimensional pixels) are grouped and tagged according to the material they belong to (e.g., bone and tissue, see reference VI). Each material is shaded separately according to whether only its surface should be displayed or its entire region (see reference XIII). Thus, one opacity transfer function can be used for each material, having an upper bound equal to 1. Then, the data is encoded and compressed as explained in the following section.

The data set is visualized using the raycasting algorithm mentioned above. The method offers arbitrary perspective projections and even walk-throughs. Consequently, the raypoints do not coincide with the grid points and the data set is therefore tri-linearly interpolated at the resample locations (as discussed below). The visual appearance is further improved by performing depth-cueing. The material tags in conjunction with user-supplied transparency parameters enables us to display a given structure exclusively or to blend different materials during rendering.

Compression and Redundant Coding

Figure 1A:
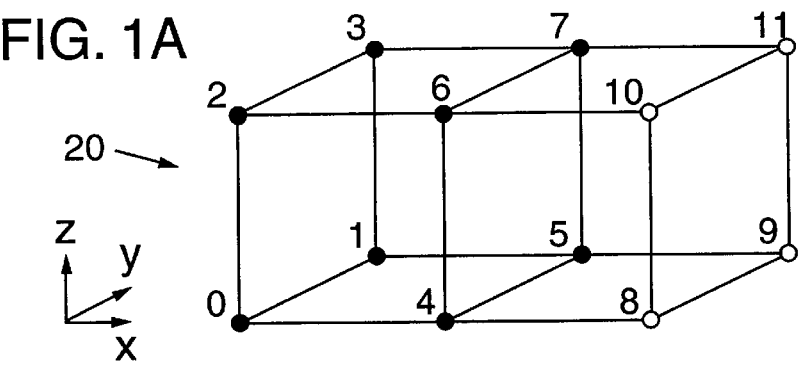
FIG. 1A is a visual representation of a voxel block used in accordance with this invention.
Figure 1B:
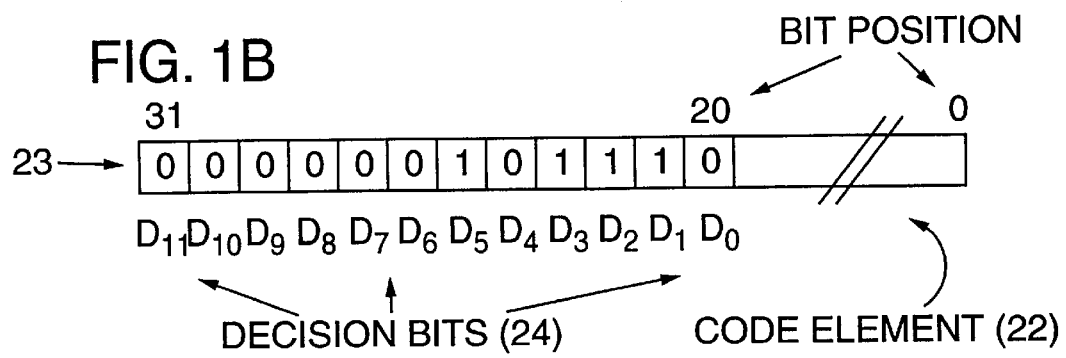
FIG. 1B represents an array denoting a decision vector D which represents a voxel block like that shown in FIG. 1A.

The compression algorithms are borrowed from 2D image processing (see References IV, V, X) and are briefly reviewed for completeness. The application of these compression techniques to volume data sets is straightforward. Since most workstations can handle 32 bit words conveniently, we chose to pack twelve (12) voxels 20 into one 32 bit code element 22, as shown in FIG. 1A. Note that in the example of FIG. 1A, that only the black voxels are above the threshold. FIG. 1B shows an array 23 of decision bits 24 and code elements 22 representative of the voxels 20 shown in FIG. 1A.

Figure 2:
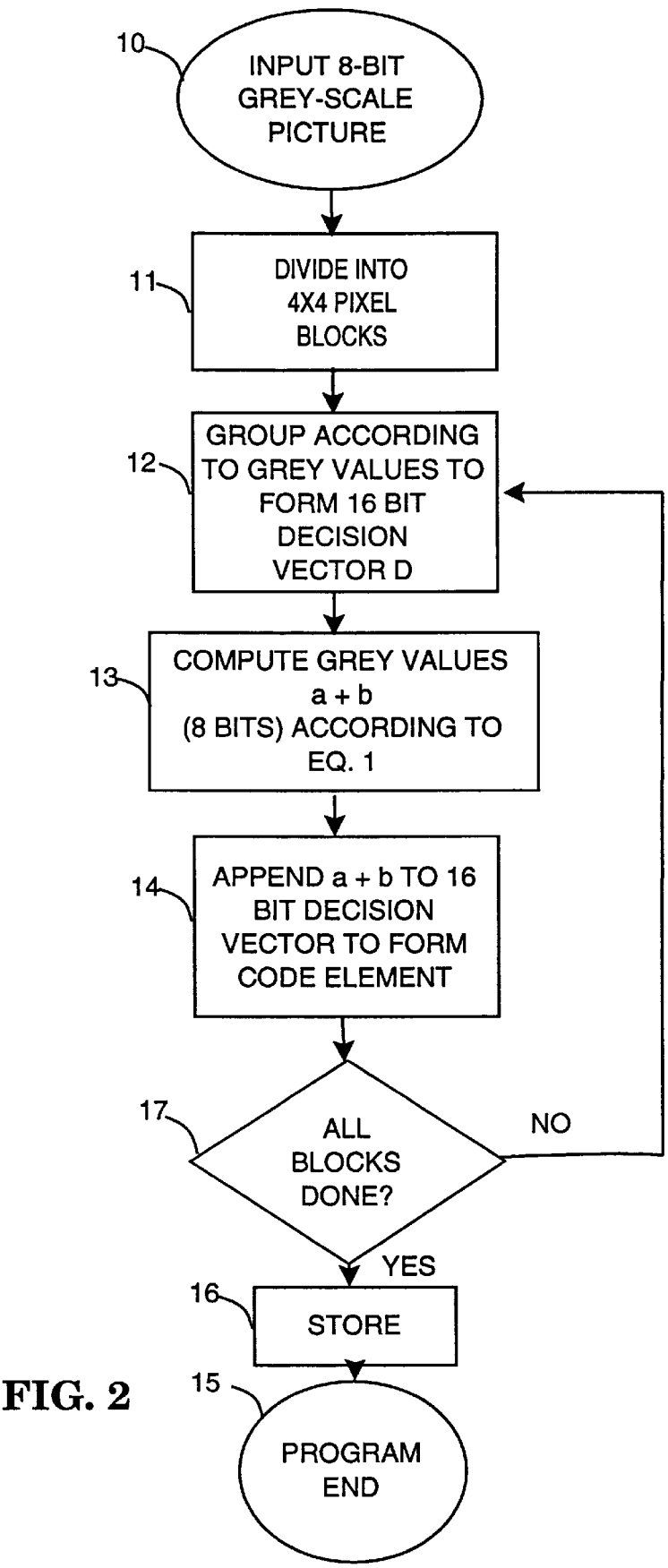
FIG. 2 is a flow chart of blockwise two-level quantization of grey scale images, also known as Block Truncation Coding.

FIG. 2 is a flow chart illustrating the compression algorithm's step in two-dimensional imaging. Given an 8-bit grey scale picture 10, the image is divided into 4×4 pixel blocks 11 in which the pixels are grouped 12 according to whether their greyvalue is above (or equal to) or below the average grey-value η of the entire block. The result of this operation is a 16 bit decision vector D 24 for each block. For each group of "lower" and "upper" pixels new greyvalues a and b are computed 13 such that the block mean η and the variance $\sigma^2$ are preserved. Given q and p as the number of pixels above and below the block mean, respectively, a and b are computed by:

$$a = \eta - \sigma \cdot \sqrt{q/p} \text{ and } b = \eta + \sigma \cdot \sqrt{p/q} \quad (1)$$

Figure 3:
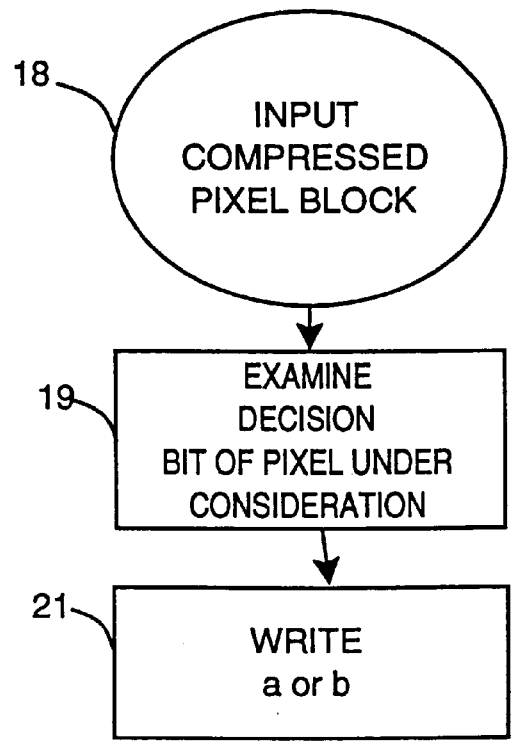
FIG. 3 is a flow chart of the decompression algorithm of compressed images according to the flow chart of FIG. 2.

The new values a and b are appended to the 16 bit decision vector 14 to form the code element 22 for one 4×4 pixel block and then stored 16. After determining if all blocks are completed 17, the program ends at 15. Using 8 bits for both a and b, this scheme achieves a reduction to 2 bits per pixel. The example demonstrated above is a variant of the block truncation coding (BTC) algorithm (see Reference V). Turning to FIG. 3, note that the decompression 18 is particularly inexpensive: for each pixel in the image to be created, examine the corresponding decision bit 19 and write either a or b 21.

The reduction to 2 bits per pixel can be maintained for 24-bit RGB pictures using the color cell compression (CCC) technique (see Reference IV). The decision criterion now is the mean luminance Y, where $$Y = 0.3 \cdot R + 0.59 \cdot G + 0.11 \cdot B \quad (2)$$

The mean values $R_u$, $G_u$ and $B_u$, computed from the color components of the upper pixels, are assigned to the upper group. The same is done for the lower pixels. At this time, a 64 bit word $DR_lG_lB_lR_uG_uB_u$ represents a 16 pixel block. In the next step, a look-up table of 256 colors is constructed which best represents the set of colors present in the code elements, for example, by using the median cut algorithm (see Reference XI). Each RGB-triple is then replaced by a pointer P into that look-up table, so that finally a 4×4 pixel block is compressed into a 32 bit code element $DP_lP_u$. Optionally, two separate color look-up tables could be used for the upper and lower colors.

The decompression expenses for CCC are slightly increased, since two table look-ups must be performed additionally for each pixel block.

Note that these compression schemes do not achieve the optimal quantization in terms of mean square error or mean absolute error (see Reference V), but offer an easy implementation and a high speed.

The decision vector D 23 occupies twelve (12) bits in any given code element 22. Thus we can spend 10 bits to characterize the upper and the lower group. The actual contents of these bit fields depend on the kind of data set and the visualization method used. For example blood vessels are commonly visualized from MR data sets using a maximum projection. The resolution of the scanning devices is typically 12 bits. Since only the maximum value along a ray is displayed, one can discard all voxels below a certain threshold during compression without losing relevant information. The remaining voxel values are then quantized in 10 bits, e.g., by a histogram equalization (see Reference VIII). For grey-level gradient shading, the upper and lower bit fields hold the emitted light intensity in up to 10 bit resolution. For colored gradient shading, pointers into 1K entry color look-up tables can be used. $P_u=0$ denotes an empty code element, i.e., all voxel values are zero. If only 8-bit greyvalues or pointers are used, the remaining bits can be used to group the voxels into different materials. For each code element 2, the bits are set according to the material tag which occurs the most often. Consequently, each volume rendering method requires its own coding scheme.

Figure 4:
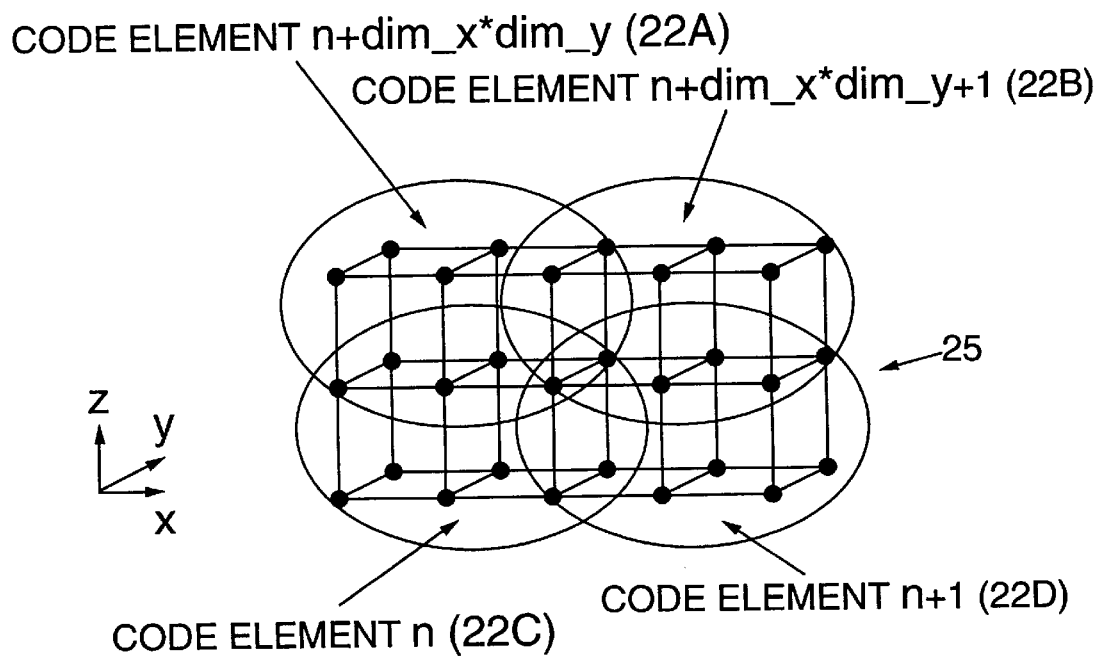
FIG. 4 is a visual representation of the grouping of elements of FIG. 1A under redundant block compression.

Considering just a single code element, we can see the first major advantage of this method: after performing a single memory access, all voxels needed for tri-linear interpolation are available. To make this true for the entire data set, we have to compress and code all voxels redundantly, as shown in FIG. 4 illustrating code elements 22A, 22B, 22C and 22D. As a consequence, all voxels at positions 0, 1, 2, 3, 8, 9, 10 and 11 in FIG. 1A are represented 8 times, and the voxels at position 4, 5, 6 and 7 are stored 4 times in the coded data set. This is why we call this method Redundant Block Compression (RBC). Thus, for original data sets of 16 bit voxels, the coded data set has just the same size. To be precise, if the original data set dimensions were x×y×z, the coded data set occupies 2×x×y×z bytes. Note that in FIG. 4, that for clarity the redundant operation in the y-direction is not shown but applies as well.

Simplified Tri-Linear Interpolation

Figure 5:
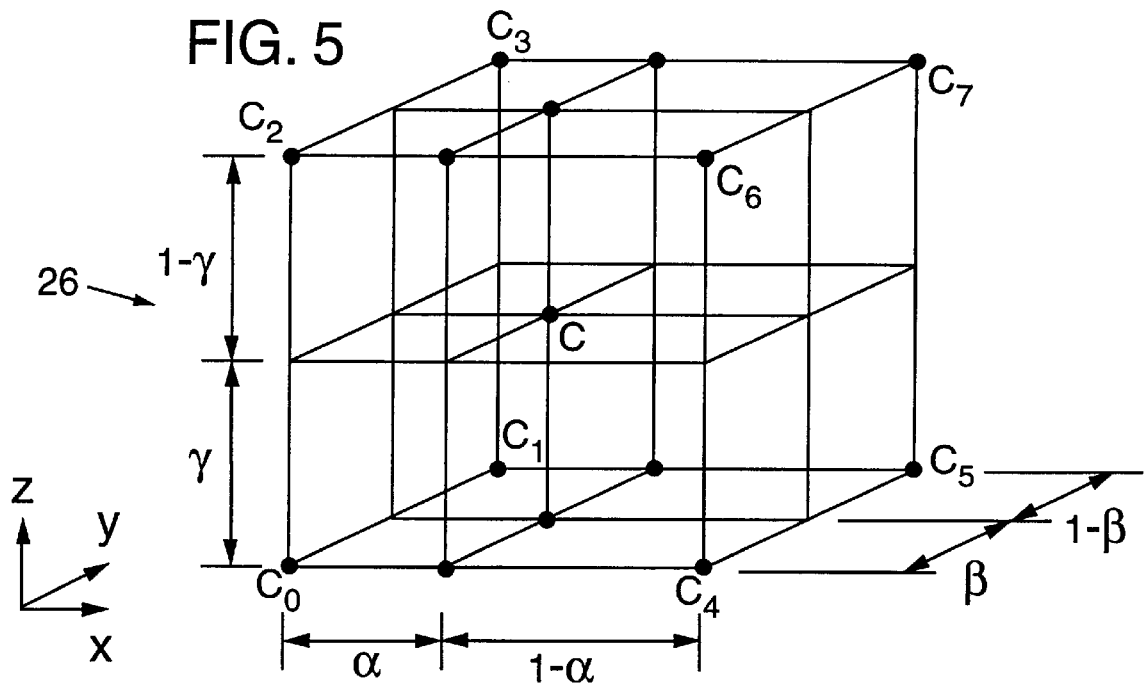
FIG. 5 is a visual representation of a volume cell with eight grey values with respect to points 0, 1, 2, 3, 4, 5, 6 and 7 as shown in FIG. 1 which undergo the tri-linear interpolation process of this invention.

The second major advantage of this coding scheme is that the tri-linear interpolation (that is, finding a value between those given by the voxels in a given volume cell) is simplified to the largest extent. Let's consider a volume cell 26 with the eight greyvalues $C_0 \ldots C_7$ at the corners as shown in FIG. 5.

The desired greyvalue C at the offset $(\alpha, \beta, \gamma)$ within the cell is given by:

$$C = C_0 \cdot (1-\alpha) \cdot (1-\beta) \cdot (1-\gamma) + C_1 \cdot (1-\alpha) \cdot \beta \cdot (1-\gamma) + \quad (3)$$
$$C_2 \cdot (1-\alpha) \cdot (1-\beta) \cdot \gamma \cdots + C_7 \cdot \alpha \cdot \beta \cdot \gamma$$

Written differently:

$$C = C_0 \cdot \omega_0 + C_1 \cdot \omega_1 + C_2 \cdot \omega_2 + \ldots + C_7 \cdot \omega_7 \quad (4)$$

Since there are only two different greyvalues $C_u$ and $C_l$ in any given volume cell, we can factor out Eq. 4 in 256 possible ways:

$$C = C_u \cdot (\omega_a + \omega_b + \ldots + \omega_c) + C_l \cdot (\omega_d + \omega_e + \ldots + \omega_f) \quad (5)$$

Figure 6:
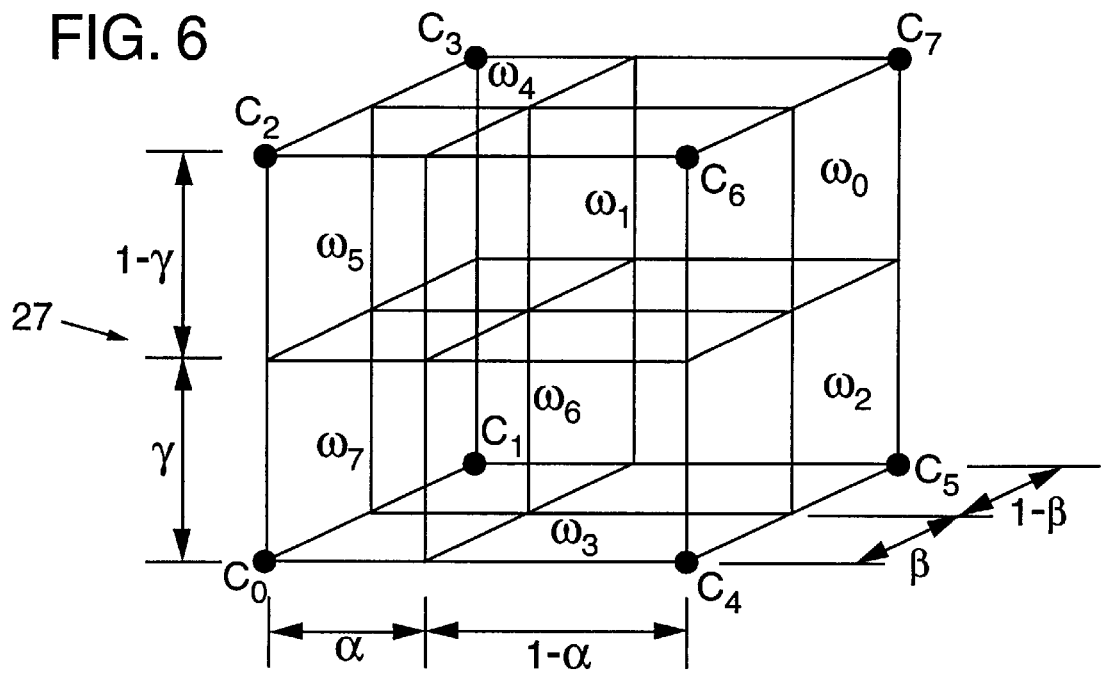
FIG. 6 is a representation of a volume cell and its associated weightfactors with respect to points 0, 1, 2, 3, 4, 5, 6 and 7 as shown in FIG. 1.

The weightfactors $\omega_n$ can be considered as the contents of the subvolumes shown in FIG. 6.

Obviously, they sum up to 1. If $\omega_l$ is the compound weight for $C_l$, then $$C = C_u \cdot (1 - \omega_l) + C_l \cdot \omega_l = C_u \cdot \omega_l (C_u - C_l) \quad (6)$$

Figure 7:
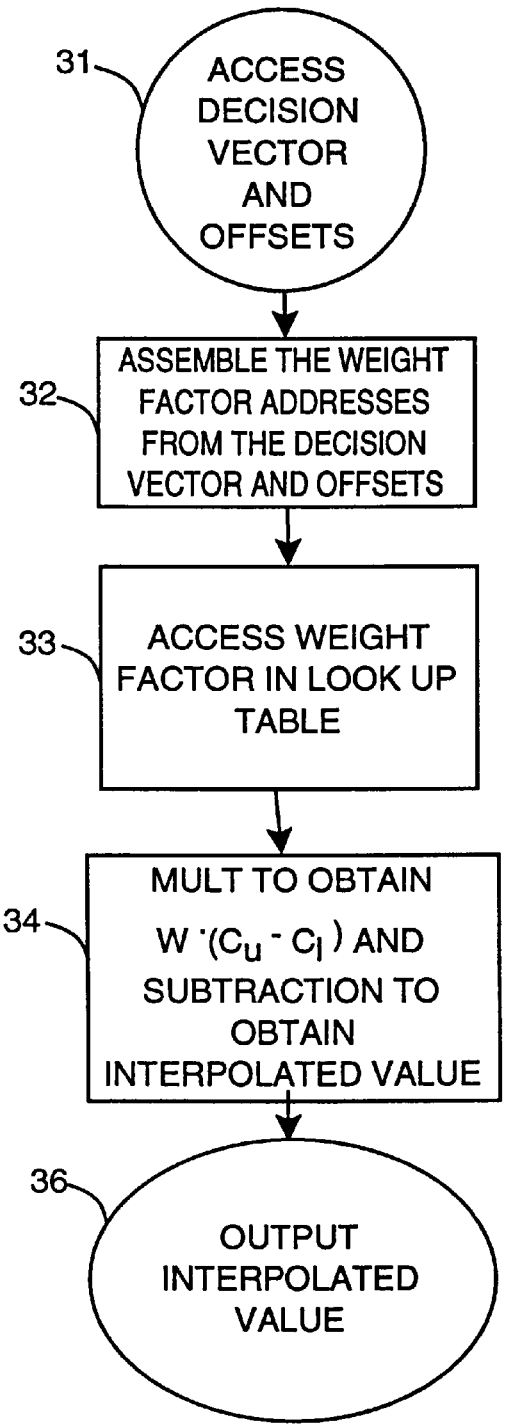
FIG. 7 is a flow chart of the tri-linear interpolation process of the volume cell as shown in FIG. 5.

If all α, β and γ have 4 bit precision, which is sufficient in most practical cases, then any given distribution of upper and lower values in (5) can give 4096 possible values for $w_l$. All in all, $\omega_l$ depends on an 8 bit decision vector and three 4 bit offsets, giving a total of $1M = 2^{20}$ different configurations. Thus we can easily precompute the weightfactors for each possible configuration and store them in a table. Furthermore, as implied by Eq. 6, we do not store $C_u$ and $C_l$ in the code elements, but instead $C_u$ and $(C_u-C_l)$. Then, as shown in FIG. 7, a complete tri-linear interpolation is performed by accessing the decision vector and offset 31 assembling the weightfactor address from the decision vector and the offsets 32, one table look-up 33 and one multiplication and one subtraction 34 for interpolated output 36.

For maximum performance, the weightfactor table should be stored in a local memory (e.g., a PROM) placed on the accelerator sub-system.

For colored data sets, the accelerator additionally needs one or optionally two color look-up tables (CLUT). Accesses to the weightfactor table and the CLUT(s) can be done in parallel. The rendering speed is maintained if the accelerator contains separate processing units for each of the color components.

The size of the tables is not critical: if truncated to 8 bits, we need 1 MByte for the weights, (available in a single EPROM device) and at most 1.5 KBytes for the CLUTs (possibly integrated on the accelerator chip), if 8-bit indices are used.

Distance Coding

Classified and shaded data sets contain a high percentage of empty voxel blocks, for which $P_u$; $C_u$=0. In this case, the remaining bits of the code element are redefined. In FIG. 8A, a two-dimensional illustration, we define 8 overlapping neighborhood octants 41a–d corresponding to octants 0–3 being shown (corresponding to the 8 possible orientations of a ray in terms of the sign of its components) and determine for each octant the largest integer radius (in grid units) which can be skipped safely due to an empty neighborhood. The largest step can be 8 grid units if $C_u$ or $P_u$ have 8 bits, or 4 units if 10 bits are used for these quantities. Referring to FIG. 8B, where elements $E_1$ and $E_0$ are shown as 1 and 0 respectively, note that if the grey area is stacked up three times in the z-direction and is empty, a distance of two can be skipped if all ray components are positive.

The advantage of this technique is that no separate acceleration data structure (e.g., an octree) is needed, and thus, skipping empty space requires neither additional memory capacity nor bandwidth. The spatial arrangement of objects in the neighborhood of an empty block is described more precisely as in previous work (see Reference XV), so that an unnecessary reduction of the stepsize in the vicinity of objects that will not be hit occurs less often.

The maximum stepsize of 8 (in grid units) is usually satisfactory except for the regions outside the bounding volume of the objects. Thus, techniques like PARC (see Reference III), which use a large set of polygons to better describe the bounding volume of an object can very well complement our method, and will be implemented in a later version.

Rendering

In the remainder of this paper we will only consider monochrome data sets, since the accelerator prototype only works on greyvalues, however, the same principles ready apply to color rendering.

Figure 10A:
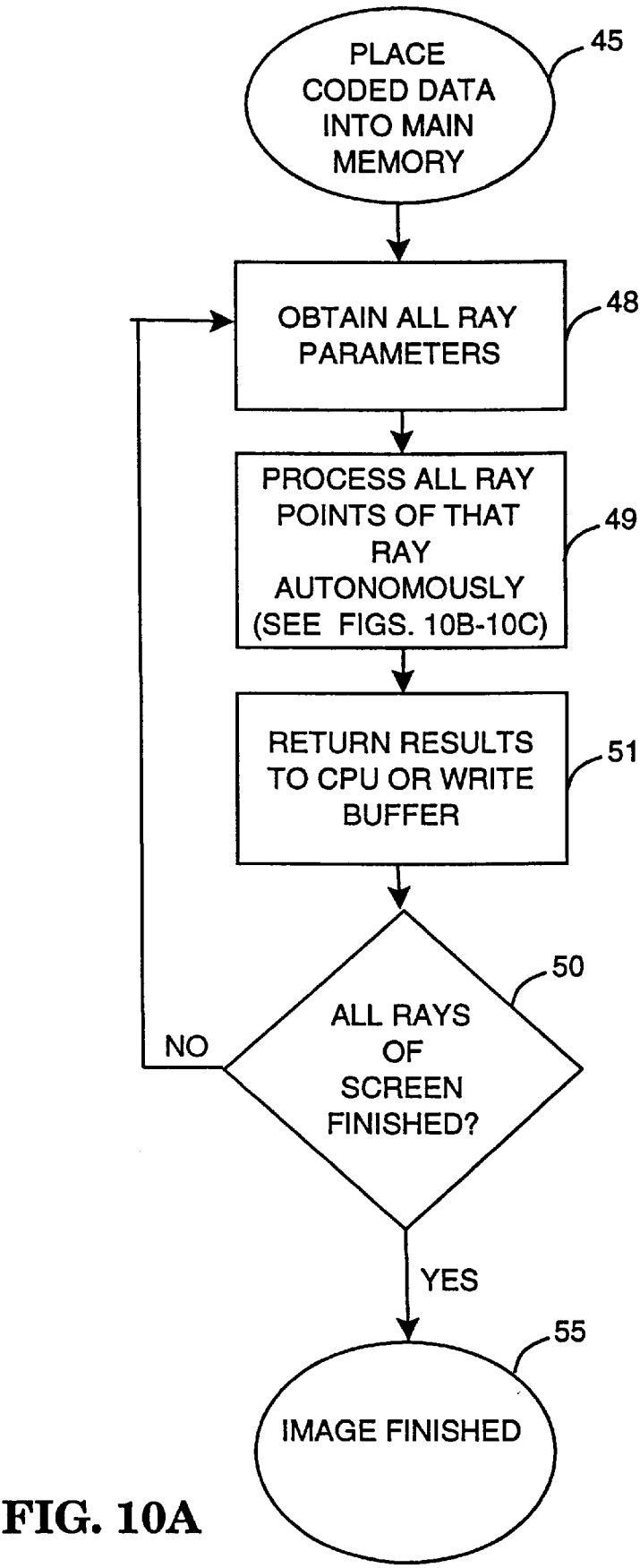
FIGS. 10A, 10B, 10C and 10D are flow charts of the rendering process of this invention.
Figure 10B:
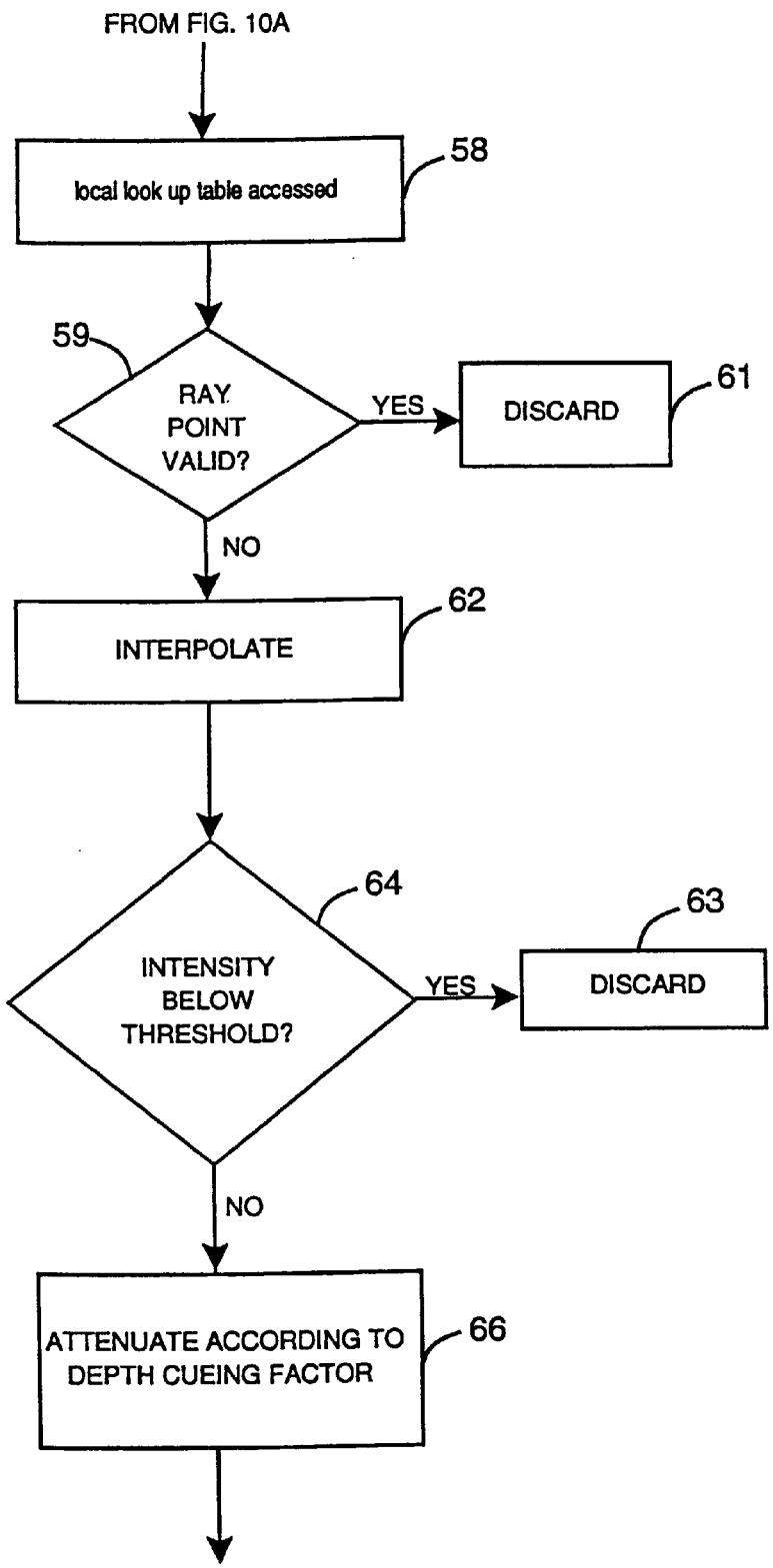
Figure 10C:
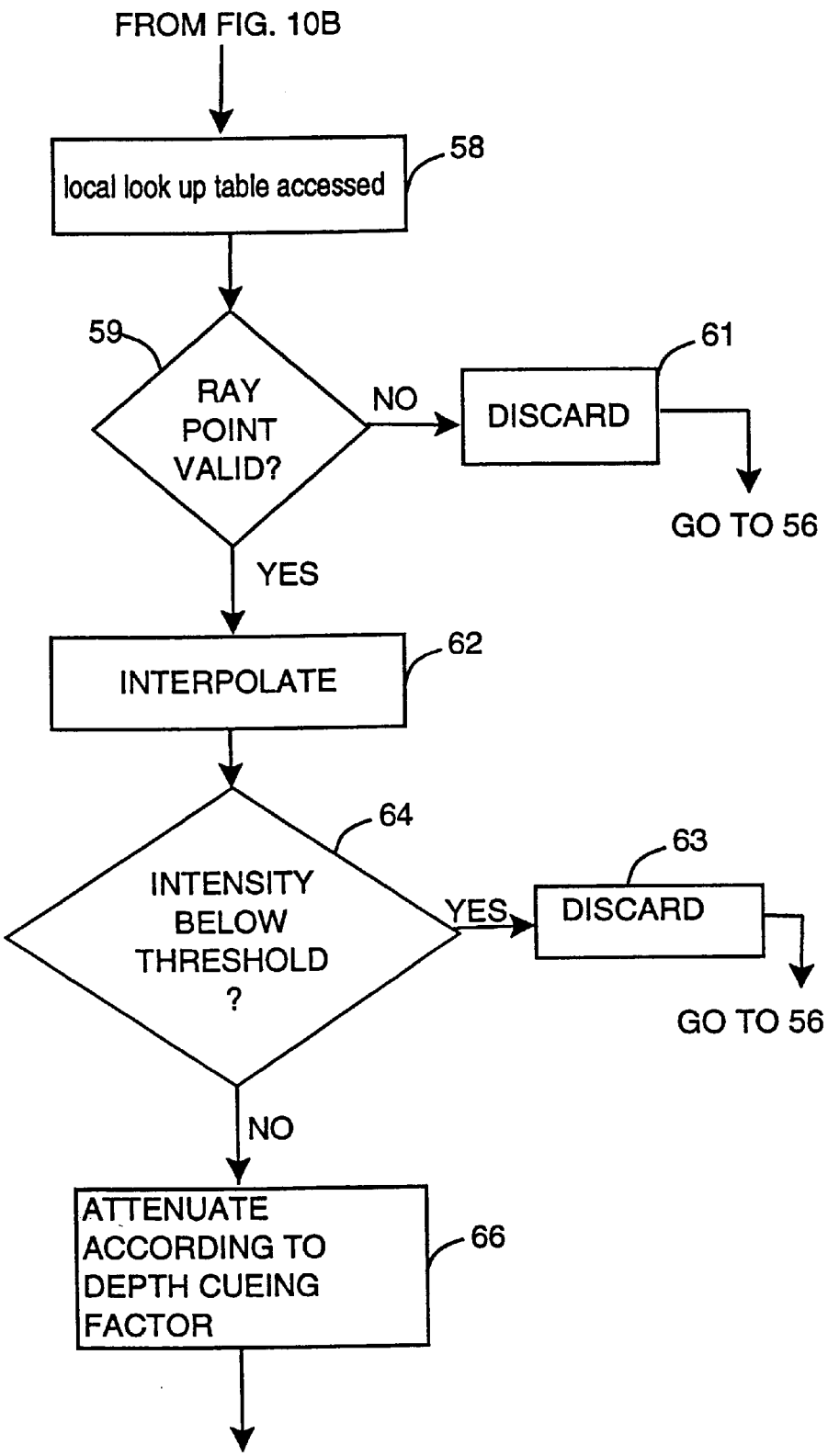
Figure 11:
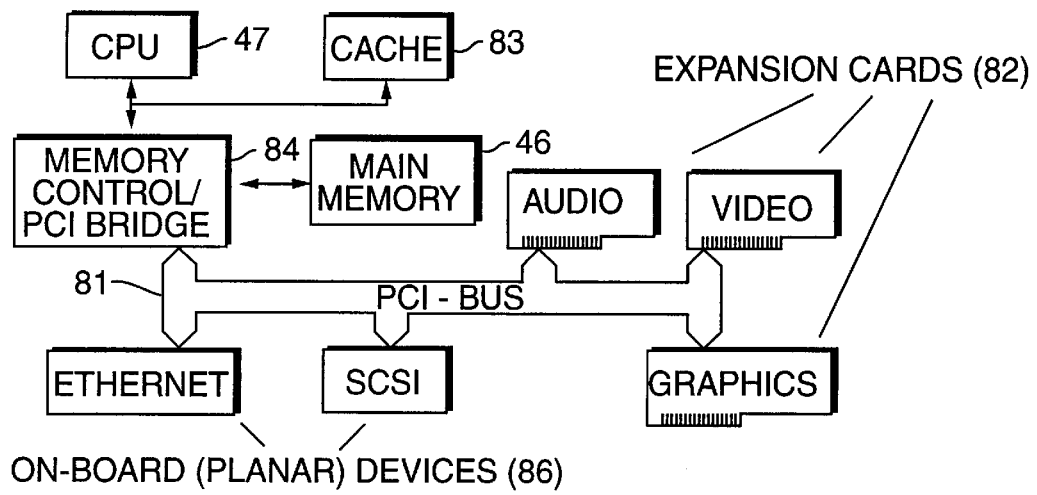
FIG. 11 is a block diagram of a typical PCI-system in which the present invention is implemented.

In FIG. 10A, step 45, the coded data set 3 of FIG. 1A is placed into the main memory 46 of FIG. 11 of the PCI-host and rendered by the accelerator using perspective raycasting. Computation of camera parameters according to user inputs and ray generation is performed by the host-CPU 47. After having obtained all ray-parameters 48 from the CPU 47, the accelerator processes all points of that ray autonomously 49 and returns the results 51 to the CPU or writes the pixel color directly into the frame buffer of the system. The ray-parameters include: the physical address of the data set, set up once per session, a threshold value, a "landing run," a set of material properties (see above) and the coordinates of the Manhattan Distance Reference Point (see below), set up once per frame, the coordinates X.α, Y.β, Z.γ of the first resample point, the total number of raypoints, the initial attenuation factor fi and the increments of these quantities, set up once per ray. After step 51, whether all rays of the screen are finished is determined. If so, the process is complete at 55. Otherwise, the process repeats starting at step 48. After step 51, whether all rays of the screen are finished is determined. If so, the process is complete at 55. Otherwise the process is repeated starting at step 48.

Linear depth-cueing (see Reference VII) is performed according to the nearest and the farthest point of the volume, as depicted in FIG. 9.

Figure 10D:
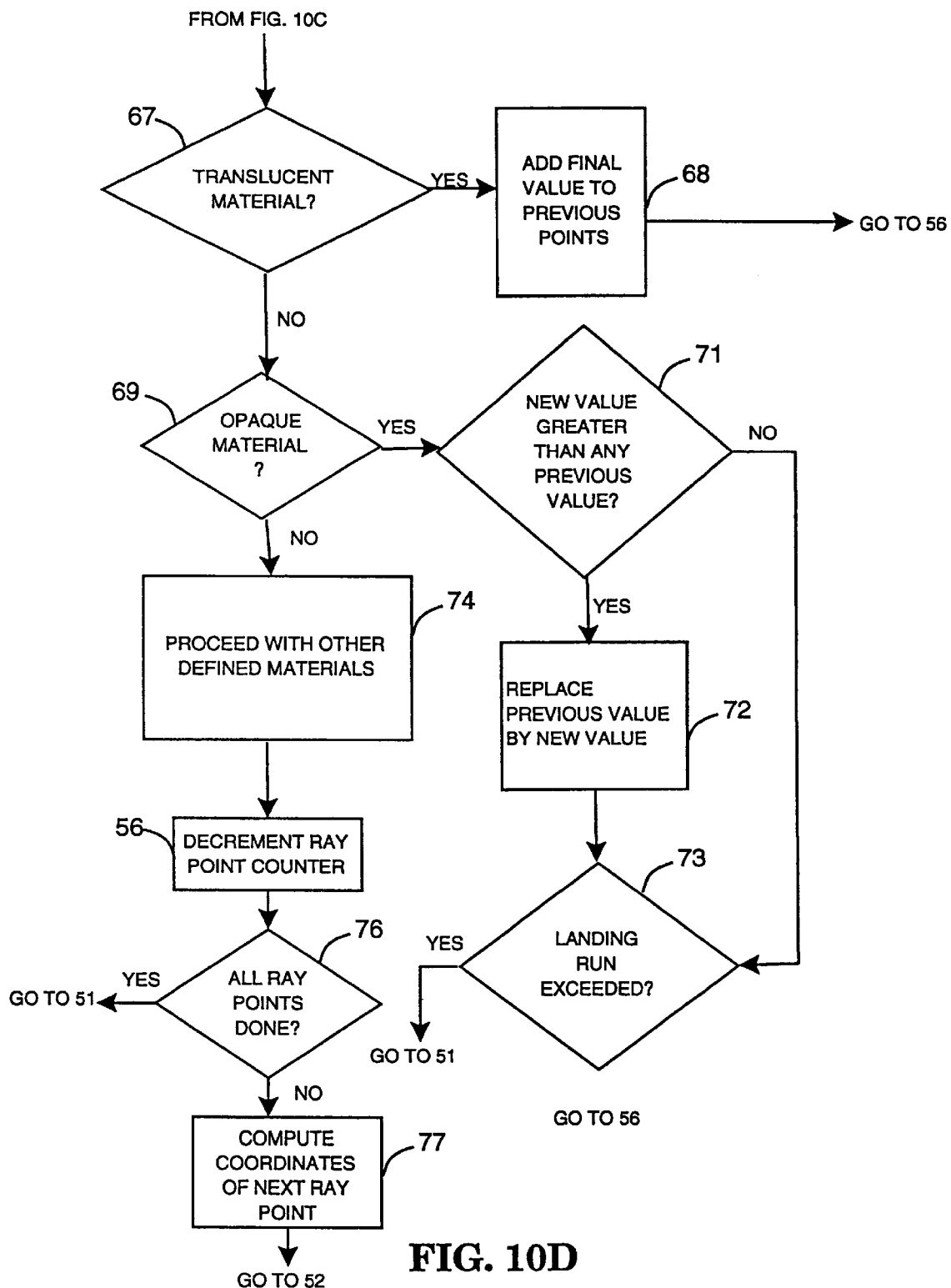

After being set up with the ray-parameters, the accelerator computes the physical address of the first raypoint, arbitrates for PCI-ownership and fetches the code element 22 (see FIG. 1B) at step 52. If the code element is empty 53, the skip distance (see FIG. 8A) within the code element is selected by the value in the ray orientation register 111 at step 54. The raypoint counter is decremented 56 (see FIG. 10D) and the address of the next raypoint and its depth-cueing factor are calculated according to the skip distance (which is set to zero for non-empty cells). The next memory access is initiated immediately thereafter.

Parallel to that, if the volume cell is non-empty, the address of the weightfactor is assembled 57, and the local look-up-table is accessed 58. Besides that, the material tag bits within the code element address the material properties RAM, which holds a user-definable property for each specific material. The possible properties are: invalid, the material is currently of no interest, and the raypoint is discarded; opaque, the material is subject to the threshold operator; translucent, the light intensities of all ray-points of that material are accumulated.

As soon as the weightfactor is available, the simplified tri-linear interpolation 62 is performed if the raypoint is valid 59. If not, it is discarded 61. The raypoint can still be discarded if the interpolated intensity 64 is below the threshold. In the other case, the light intensity is attenuated according to the associated depth cueing factor 66.

In case of translucent material 67, the final value is added to all values of previous points of the same material 68.

In case of opaque material 69, a special threshold operator applies 71. For the first point in opaque material exceeding the threshold, the raypoint counter is set to a user-programmable landing run (or to the actual value, whichever is less) 72, and only the largest value found within that distance will be returned to the host 73.

In the prototype implementation currently under development, four different materials can be defined 74, and thus, the accelerator has four accumulators in case all materials are set to translucent. The grey value of an opaque material is stored in a separate register. Once all ray points are done at step 76, the program proceeds to step 51. Otherwise, the program proceeds to step 77. Once all raypoints are done at step 76, the program proceeds to step 51. Otherwise, it proceeds to step 77.

Thus, separate frames for each material are produced, from which the final screen 76 (see FIG. 9) is composed by the host-CPU. Note that this is an inexpensive two-dimensional operation, which is performed very quickly. Thus, if the user wishes to blend the structures differently, but the camera parameters haven't changed, no volume rendering operation must be done and the system responds immediately.

A maximum projection is performed by setting all material to opaque and the landing run to infinity.

The PCI-Bus

In the PC-market, the PCI-Bus (Peripheral Component Interconnect, see Reference I) has almost completely replaced all existing bus standards within a few months. Besides that, it is more and more becoming a standard in the workstation area as well. The PCI-bus constitutes an acceptable trade-off between low costs and high system speed.

A typical PCI-system is shown in FIG. 11. The PCI-bus 81 is a multi-master bus, allowing a device on an expansion card 82 to initiate a transfer while the CPU can potentially continue its work out of the cache. CPU 47 is further in communication with cache 83, memory control 84 and on-board devices 86.

Figure 12:
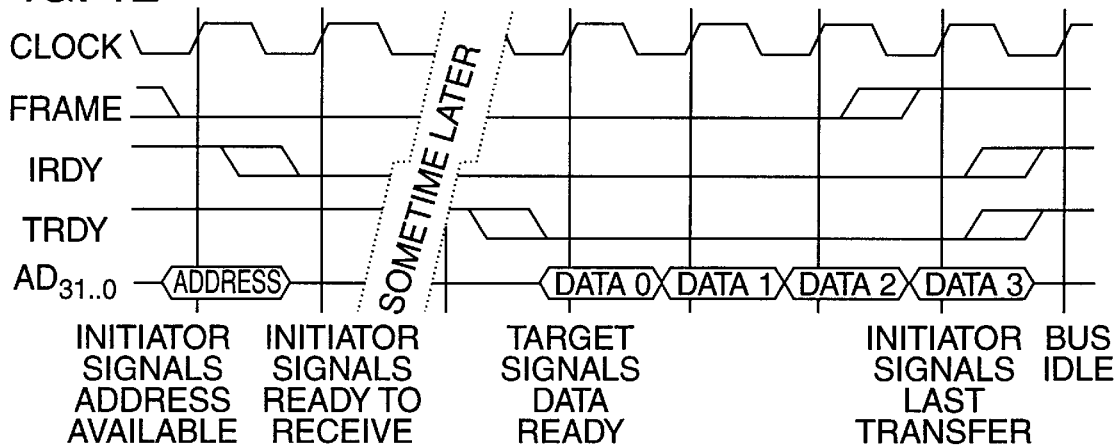
FIG. 12 is a timing diagram illustrating an example of a PCI-burst-transaction.

The PCI-bus is designed for burst transfers, i.e., a large number of data transfers following a single address transfer as shown in FIG. 12. For this reason, and to reduce system costs, it has a multiplexed address/data-bus of 32 bits. Both the initiator and the target control a handshake signal (IRDY and TRDY in FIG. 12) to insert waitstates if necessary.

All transactions are synchronous to a common clock. Current specifications allow clock rates of up to 33 MHz and thus, a 32-bit PCI-system has a theoretical peak transfer rate of 132 MByte/s.

XILINX FPGA Architecture

The two different parts used in this design provide a high number of I/O-blocks (176 for the XC3195A and 160 for the XC4013), each of them offering a bi-directional buffer and register pair (see Reference II). All arithmetic and logical units are implemented in so-called Configurable Logic Blocks (CLBs), which basically consist of two flipflops and a set of function generators. A function generator is a look-up table (SRAM) which is addressed by the input variables. The number of input variables varies between four and five. Implementing a boolean function is done by loading the function generator RAM with the appropriate data. The number of CLBs is 484 for the XC3195A and 576 for the XC4013. For the XC4013, each CLB can be configured as a 16×2 bit SRAM, so that this device offers up to 18.432 bits storage capacity.

Implementation

Figure 13:
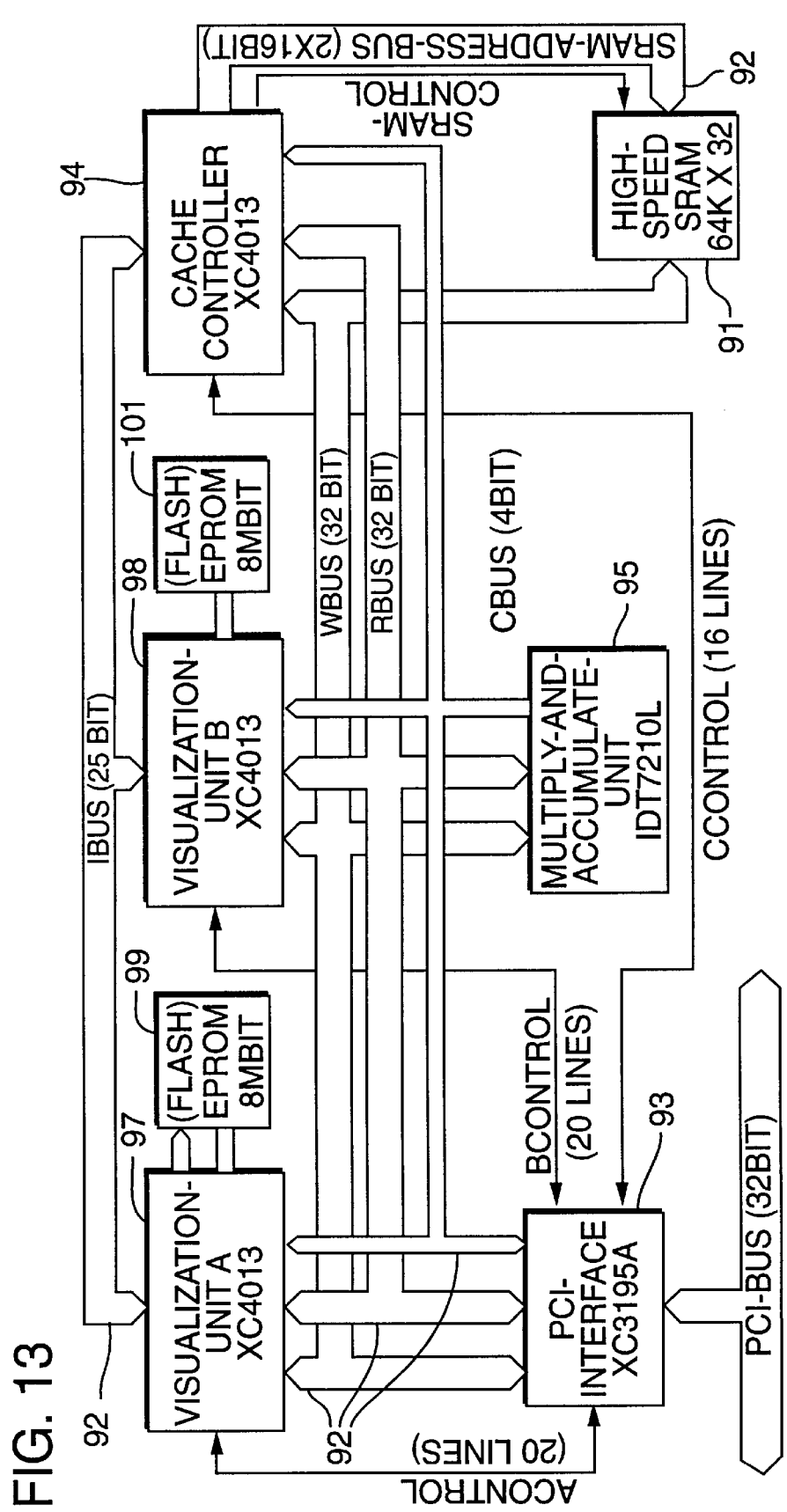
FIG. 13 is a block diagram illustrating the overall architecture of an accelerator used in accordance with this invention.

A simplified block diagram of the accelerator is given in FIG. 13. The on-board bus structure is given for clarity only and can be adapted to other requirements; essentially there is one 68 bit local bus and one 25 bit bus connecting the 4013 devices. The different units are described in the following sections.

PCI-Interface Unit

The PCI-Interface Unit 93 manages the dataflow through several buses 92 and controls the operation of all other units via point-to-point control lines. On the PCI-side, it offers a combine Master/Target-interface.

Figure 14:
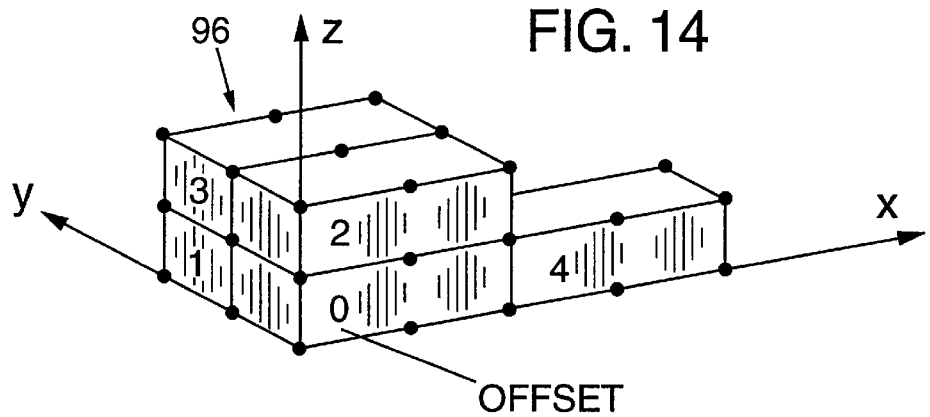
FIG. 14 is a block diagram of an example of cache block organization which is used by the accelerator of FIG. 13.

Data from memory is fetched in packets of four code elements, which form one cache block 96 (see FIG. 14), via a read-burst transfer. Since there is no principal ray direction, we place a subcube of 2×2×2 volume cells into one cache block, as shown in FIG. 14.

The linear offset $\Omega$ of a code element in memory is derived from its logical coordinates by $$\Omega = Z_{7\ldots1} Y_{7\ldots1} X_{7\ldots1} Z_0 Y_0 00 \tag{7}$$

A cache block 96 is stored in four consecutive locations in the high-speed SRAM 91. The grid point with the smallest X-, Y- and Z-coordinates within a cache block 96 is called the Reference Point.

Visualization Unit

Each of the two Visualization Units A and B, 97 and 98 and their associated FLASH EPROMS 99 and 101 implements the complete raycasting algorithm. The reason for the presence of two such units is as follows: Since the address of the next resample location depends on the actual volume cell (by means of the distance coding), there is a certain delay before a Visualization Unit can hand out the next address after having obtained a code element. To avoid idle times in the system, we use two identical Visualization Units which follow two different rays in parallel. Multiply-and-Accumulate Unit 95 is associated via bus system 92.

Figure 15:
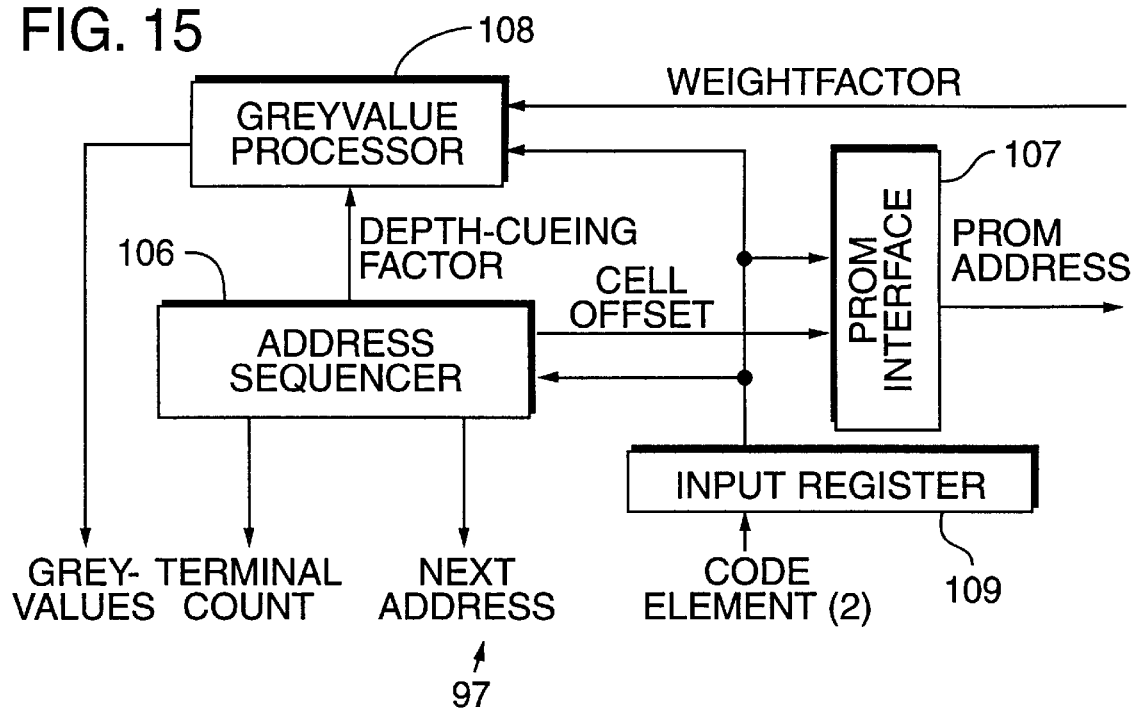
FIG. 15 a block diagram of a visualization unit of FIG. 13.

The Visualization Unit (97 or 98) as shown in FIG. 15 basically consists of three sub-units: the address sequencer 106, the PROM interface 107 and the greyvalue processor 108. Additionally, input register 109 receives code element 22.

Figure 16:
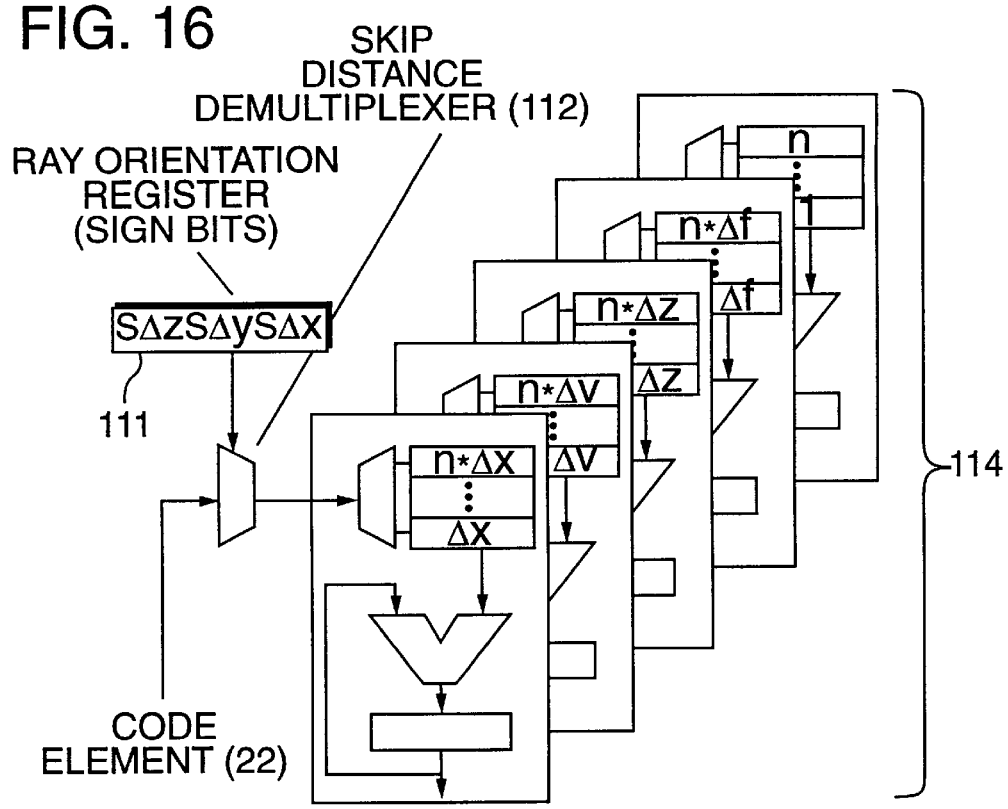
FIG. 16 depicts pre-computed increments which is addressed by the skip distance of FIGS. 8A and 8B carried out by SRAM-based incrementers.

The address sequencer is a collection of incrementers 113, one for each the x-, y- and z-component of the raypoints, the depth-cueing factor (see FIG. 9 and associated discussion) and the raypoint number (see discussion on rendering above). Increments are added according to the skip distance (see FIG. 8A). As shown in FIG. 16, an inexpensive implementation uses an 8-entry on-chip SRAM, which holds the pre-computed increments 114, and which is addressed by the skip distance 112 to form increments 114.

The weightfactor address is assembled as $$D_{7\ldots0} \gamma_{-1\ldots-4} \beta_{-1\ldots-4} \alpha_{-1\ldots-4} \text{ if } X_0=0 \text{ or}$$

$$D_{11\ldots4} \gamma_{-1\ldots-4} \beta_{-1\ldots-4} \alpha_{-1\ldots-4} \text{ if } X_0=1.$$

The greyvalue processor computes Cu- wl*(Cu-Cl) and, if the result is greater than the threshold, multiplies the greyvalue with the depth-cueing factor in a second pass. It has an 8×8→8 bits multiplier with a delay time of 50 ns. As mentioned above, the greyvalue processor has four accumulators and one register for opaque material, from where the host-CPU can read the results.

Cache

Figure 17:
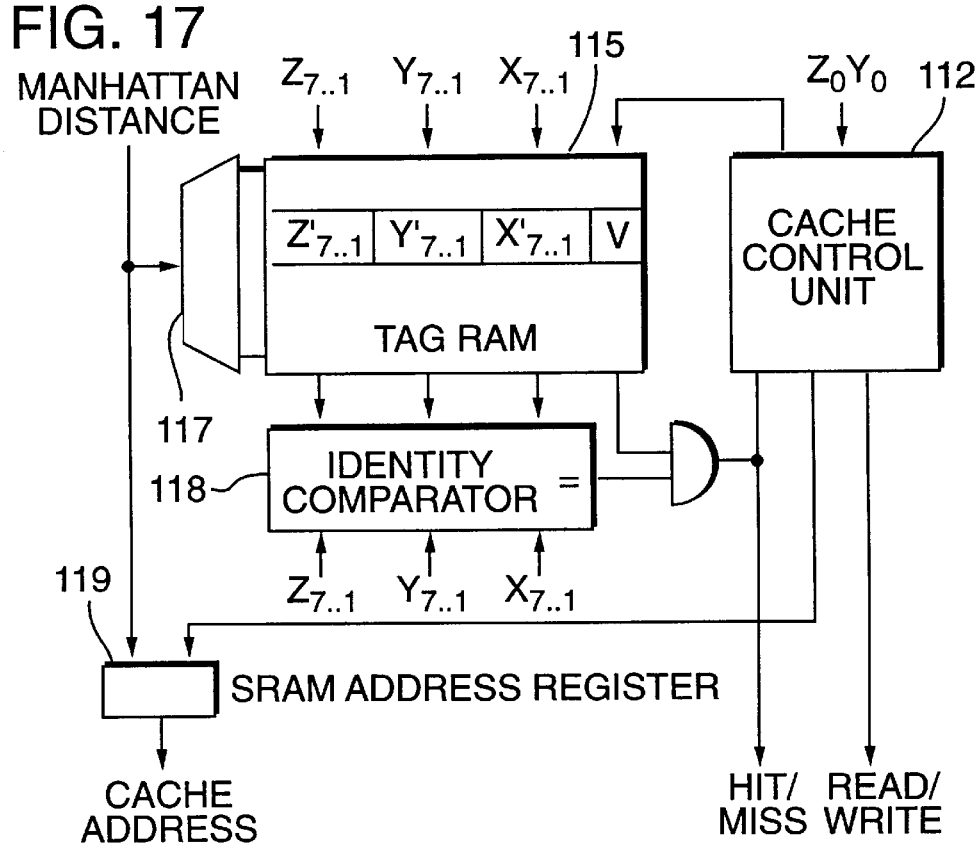
FIG. 17 is a block diagram of the Tag RAM and Cache Control which is part of the accelerator of FIG. 13.

The cache system 94 (see FIG. 13) consists of a XILINX 4013 device 94 and two 64K×16 high-speed SRAM devices 91. The cache organization is direct mapped, however, relative to the one-dimensional coordinate system of the actual ray. We use the Manhattan Distance of the Reference Point of the actual resample location to the Reference Point which has the smallest distance to the eye point (which is called the Manhattan Distance Reference Point) as cache index. Therefore, the cache tag RAM 11 of FIG. 17 needs 384 entries. Each tag RAM entry holds the logical coordinates of the Reference Point of the cache block and a valid flag and thus stores 22 bits. The tag RAM has a total capacity of 8448 bits, and thus fits into the XC4013 device. A simplified block diagram of the tag RAM is shown in FIG. 17.

The operation is as follows: whenever the PCI-Interface Unit reads a code element 22 address from either one of the Visualization Units 97 or 98, the Manhattan Distance D and the logical coordinates $Z_{7...0}Y_{7...0}X_{7...1}$ of the code element 22 are transferred to the Cache Controller 94. The tag RAM 115 is addressed by the Manhattan Distance 117 and the stored logical cache block coordinates $Z'_{7...1}Y'_{7...1}X'_{7...1}$ are compared by identity comparator 118 with the newly generated ones. In case of equality and a set valid flag, a cache hit is signalled to the PCI-Interface Unit 93, which does not start a PCI-transfer. The cache RAM 91 is read at $(DZ_0Y_0)$, and the code element 22 is passed to the requesting Visualization Unit 97 or 98.

In case of a cache miss, the new logical cache block coordinates are written into the tag RAM 115 together with a set valid flag. The Cache Control Unit 116 then waits for the four code elements 22 forming a cache block and writes them sequentially at addresses (D00), (D01), (D10) and (D11) into the cache RAM via the SRAM Address Register 119.

Note that this is a read-only cache, i.e., no modified entries must ever be written back to main memory, and that the valid flags need to be reset only once after a data set was loaded.

According to the cache block organization, rays are generated in the order of square screen blocks instead of scanlines to maximize the cache hit ratio.

Performance and Image Quality

For verification and measurement purposes, a software implementation of the algorithm was made. The example given here is a CT data set from a human skull. Data set dimensions are 256×256×216. All material except bone was removed during the pre-processing step. The bone surface was shaded using six light sources at infinity.

Figure 18A:
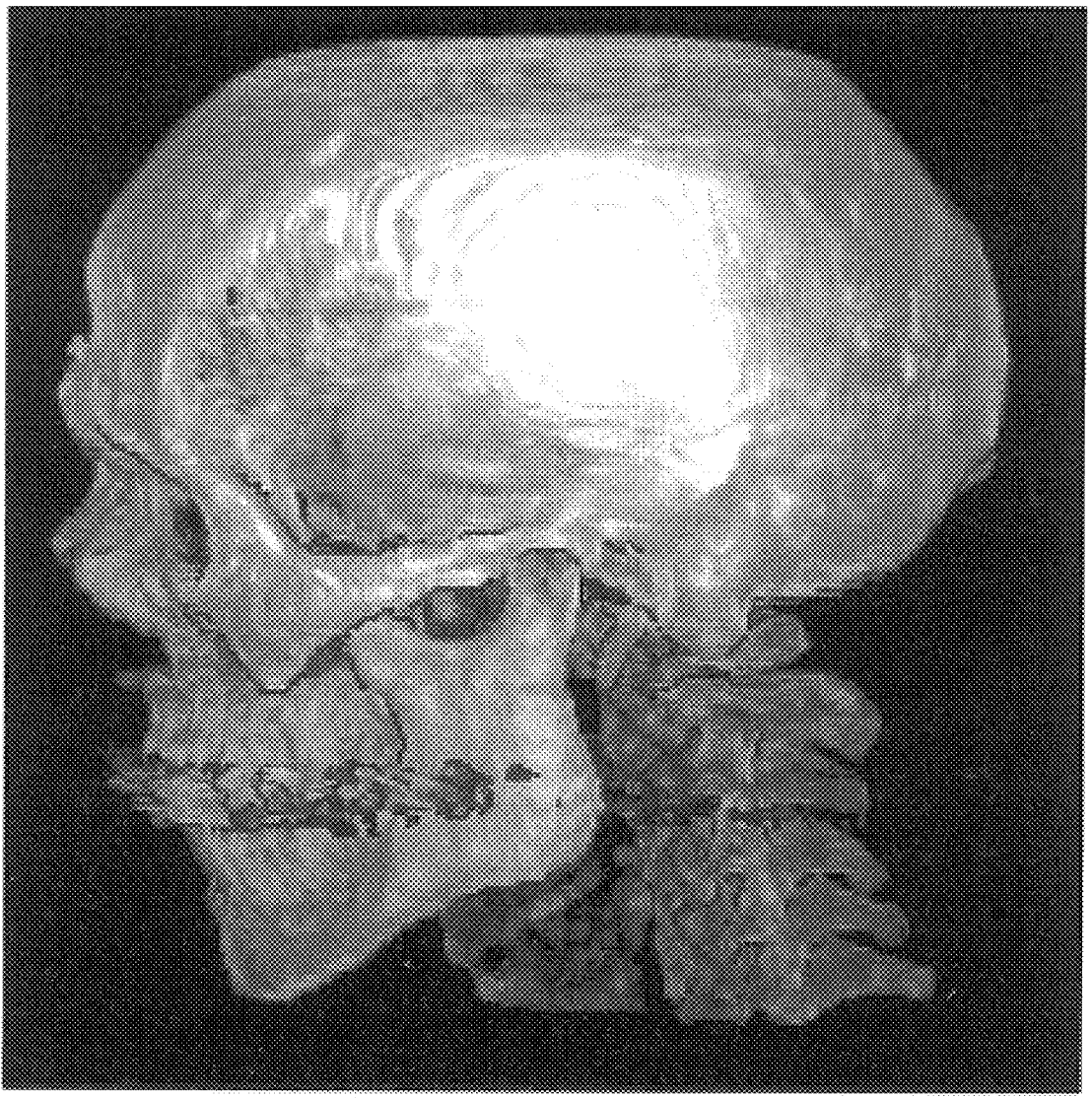
FIG. 18A is an image of a human skull as generated in accordance with this invention.
Figure 18B:
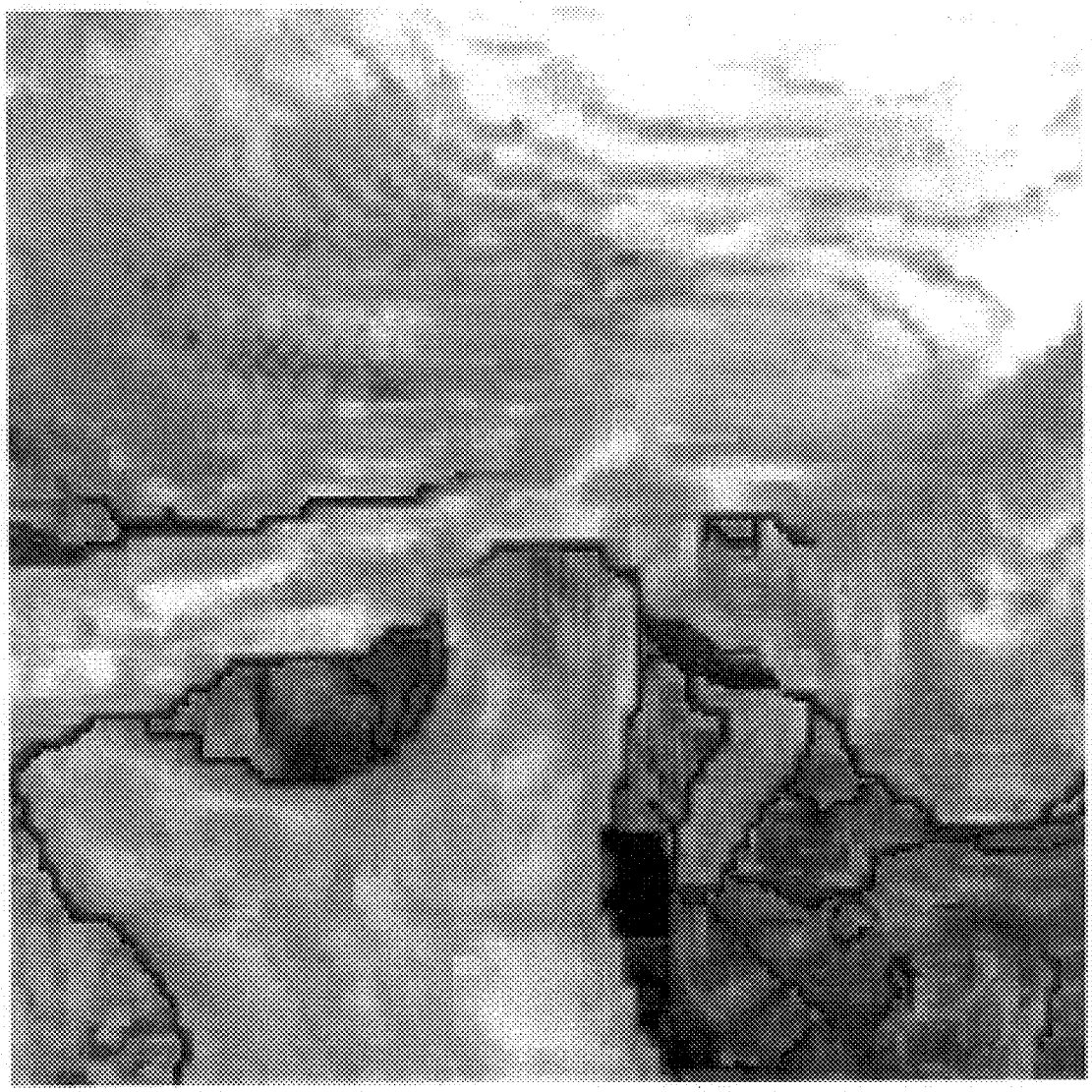
FIG. 18B is a magnified view of the image of the human skull as depicted in FIG. 18A.

The picture in FIG. 18A was created by sending 256×256 rays through the data set, and bi-linearly interpolating the frame to the final 512×512 screen resolution. The bone surface was detected by using the threshold operator as explained above. FIG. 18B shows a magnified portion of the same data set.

For a round-trip or a walk-through, between 1 and 2 million raypoints must be processed for each frame. The cache hit ratio varies between 35% for large viewing distances and close to 98% for walk-throughs.

A software simulator for a single Visualization Unit was written based on the following (pessimistic) assumptions: that the processing of a raypoint takes 240 ns (empty cell or material discarded), 360 ns (ray-point intensity is smaller than threshold) or 480 ns (complete processing); That a read-burst of four code elements (a cache line fill) takes 450 ns; and that a cache hit takes 60 ns.

Let's consider FIG. 18A: the frame required exactly 1.058.672 raypoints, of which 580.276 caused a cache miss. 801152 raypoints were in empty space. Execution time is 568 ms, giving 1.76 Hz. Since no simulator for parallel operation of two Visualization Units 97 and 98 is available, we can only estimate that the frame rate will be in the range of 2.5 to 3.5 Hz.

The magnified view in FIG. 18B required 775.312 raypoints, of which 140.417 caused a miss. 411.214 visited volume cells were empty. Execution time is 332 ms, giving a frame rate of about 5 Hz for two Visualization Units. A summary is given in Table 1. For these performance measurements, the distance of two raypoints was set to 0.95, and the maximum skip radius was 3.

TABLE 1

Performance Summary

| Ref. | #of Raypoints | Misses | Hits | Hit Ratio [%] | Empty Cells | Execution Time [s] | Estimated Frame Rate [Hz] |
|------|---------------|--------|------|---------------|-------------|-------------------|---------------------------|
| FIG. 18A | 1.058 .672 | 580.276 | 478.396 | 45.2 | 801.152 | 0.568 | 2.5–3.5 |
| FIG. 18B | 775.312 | 140.417 | 634.895 | 81.9 | 411.214 | 0.332 | 4 . 5 |

Future Work

So far we have only talked about the display of RBC-data. In the current implementation, the entire pre-processing stage including classification, shading, encoding and distance coding is done in software. This can take up to 30 minutes, which is far from being interactive. For this task, however, we can take advantage of the in-system-programmability of the FPGA devices, and employ what is called reconfigurable computing. Thus, for each step of the pre-processing algorithm, the accelerator is configured differently to provide maximum speed-up. Hardware resources are plenty (finally we got the reason for the presence of the multiply-and-accumulate unit 95), so that we're optimistic to bring the pre-processing time into the range of seconds.

Conclusions

We presented a compact and cost-efficient volume rendering accelerator which can bring volume visualization even into the PC market. Using a standard Gate Array technology, production costs can very well meet the absolute low-cost requirements of that market segment. Nevertheless, image quality and rendering speed are still high. Application areas which will benefit from this development are education in medicine, biology, chemistry and more, but also medical diagnosis and non-destructive testing.

Having described and illustrated the principles of the invention in a preferred embodiment thereof, it should be apparent that the invention can be modified in arrangement and detail without departing from such principles. I claim all modifications and variations coming within the spirit and scope of the following claims.

References

I Anonymous, "PCI Local Bus Specification, Rev. 2.0", PCI Special Interest Group, PO Box 14070, Portland, Oreg. 97214, April 1993

II Anonymous, "The Programmable Logic Data Book", XILINX Inc., San Jose, Calif., 1994
III R. S. Avila, L. M. Sobierajski and A. E. Kaufman, "Towards a Comprehensive Volume Visualization System", Proceedings of the IEEE Visualization '92 Conference, Boston, Mass., Oct. 19–23, 1992, pages 13–20
IV G. Campbell, T. A. DeFanti, J. Frederiksen, S. A. Joyce, L. A. Leske, J. A. Lindberg and D. J. Sandin, "Two Bit/Pixel Full Color En-coding", SIGGRAPH '86 Conference Proceedings, Computer Graphics, Vol. 20, No. 4, August 1986, pages 215–223
V E. J. Delp and O. R. Mitchell, "Image Compression Using Block Truncation Coding", IEEE Transactions on Communications, Vol. COM-27, No. 9, September 1979, pages 1335–1342
VI R. A. Drebin, L. Carpenter, P. Hanrahan, "Volume Rendering", Computer Graphics, Vol. 22, No. 4, August 1988, pages 65–74
VII J. D. Foley, A. van Dam, S. K. Feiner and J. F. Hughes, "Computer Graphics: Principles and Practice", Addison-Wesley, Reading, Mass., 1990, pages 727–728
VIII R. C. Gonzalez and P. Wintz, "Digital Image Processing", Addison-Wesley, Reading, Mass., 1987
IX T. Gunther, C. Poliwoda, C. Reinhart, J. Hesser, R. Manner, H.-P. Meinzer, H.-J. Baur, "VIRIM: A Massively Parallel Processor for Real-Time Volume Visualization in Medicine", Proceedings of the 9. Eurographics Hardware Workshop, Oslo, Sep. 12–13, 1994
X D. R. Halverson, "On the Implementation of a Block Truncation Coding Algorithm", IEEE Transactions on Communications, Vol. COM-30, No. 11, November 1982, pages 2482–2484
XI P. Heckbert, "Color Image Quantization for Frame Buffer Display", SIGGRAPH '82 Proceedings, Computer Graphics, Vol. 16, No. 4, August 1982, pages 297–307
XII A. Krikelis, "A Modular Massively Parallel Processor for Volumetric Visualisation Processing", Proceedings of the Workshop on High Performance Computing for Computer Graphics and Visualisation, Swansea, UK, Jul. 3–4, 1995
XIII M. Levoy, "Display of Surfaces from Volume Data", IEEE Computer Graphics & Applications, Vol. 8, No. 5, May 1988, pages 29–37
XIV H. Pfister and A. Kaufman, "Real-Time Architecture for High-Resolution Volume Visualization", Proceedings of the 8. Eurographics Hardware Workshop, Barcelona, Sep. 6–7, 1993, pages 72–80
XV K. J. Zuiderveld, A. H. J. Koning and M. A. Viergever, "Acceleration of Ray-Casting Using 3D Distance Transforms", Proceedings of Visualization in Biomedical Computing, Chapel Hill, N.C., Oct. 13–16, 1992, pages 324–335

I claim:

1. The method for the visualization of a plurality of three-dimensional data sets, each data set including a plurality of data elements, comprising the steps of:
   dividing at least one of said plurality of three-dimensional data sets into one or more three-dimensional cubic block of eight or more data elements;
   compressing each three-dimensional cubic block in a manner which provides for blockwise, two-level quantization, to form a compressed data set represented by compressed cubic blocks;
   storing said compressed data set on a storage medium to form a stored compressed data set; and
   applying a visualization algorithm to said stored compressed data set to generate a two-dimensional image on an output device.

2. The method of claim 1, wherein said three-dimensional data set includes data elements representative of numerical values at the grid points of a three-dimensional rectangular grid.

3. The method of claim 1, wherein said blocks are in the form of a particular volume including eight or more data elements.

4. The method of claim 1, wherein said blocks have a plurality of faces, edges and corners, and wherein said data set is divided into particular volumes in a space filling way, such that neighboring blocks share at least one of said faces, edges and corners.

5. The method of claim 2, wherein said step of compressing at least one of said plurality of three dimensional sets to form a compressed data set represented by blocks results in forming a code element which contains at least one decision bit for each of said data elements defining one of two levels to assign to said data element, and one of two levels for each of said blocks.

6. The method of claim 2, wherein said data elements represent at least one of brightness values and color values.

7. The method of claim 6, wherein said compression step is a first compression step which results in said two color values for each block and wherein a second compression step is applied so that said color values occupy fewer bits than those which result from said first compression step.

8. The method of claim 5, wherein said data elements are of different classes and wherein said code element contains information about different classes of said data elements within the associated block.

9. The method of claim 5, wherein said code element contains information about the neighborhood of said blocks.

10. A method for the visualization of a compressed three-dimensional data set represented by one or more compressed cubic blocks, including corresponding code elements representing at least one of color, density and transparency for each compressed cubic block, said method comprising the steps of:
   accessing said one or more compressed cubic blocks of said compressed data set from a storage medium; and
   applying a visualization algorithm to said or more one compressed cubic block of said compressed data set in a manner in which processing a plurality of said code elements operates to provide as output to an output device a plurality of corresponding rendering characteristics in real-time.

11. A method as recited in claim 10 wherein said visualization algorithm is a raycasting algorithm.

12. A method as recited in claim 10 wherein said raycasting algorithm is performed in real time on dedicated arithmetic units.

13. A method as recited in claim 10 wherein said code elements contain information about the neighborhood of said blocks.

14. A method as recited in claim 10 wherein said code elements contain information about different classes of data elements.

15. A memory system for temporary storage of data elements represented by three-dimensional cubic blocks having a plurality of coordinates of multi-dimensional data arrays, comprising:
   a plurality of addressable storage locations for a plurality of data elements and for a corresponding unique address tag, and wherein said storage locations are configured to be addressed using an arithmetic function of the cubic block coordinates of the plurality of data elements under consideration.

16. A memory system as recited in claim 15 wherein a raypoint of a ray is under consideration, said system further comprising that said storage locations are configured to be addressed using the coordinate of said raypoint under consideration relative to the coordinate system of the ray under consideration.

17. A memory system as recited in claim 15 wherein said arithmetic function for addressing said storage locations includes a calculation of the Manhattan Distance of one of said raypoint and said plurality of data elements under consideration relative to the point of said data set closest to an observer.

18. A memory system as recited in claim 15 further comprising a comparator, comparing said address tag of said addressed plurality of data elements with the address tag of said plurality of data elements under consideration.

19. A memory system as recited in claim 15 wherein said a storage unit is configured to store a plurality of data elements.

20. A memory system as recited in claim 15 wherein said plurality under consideration is received from a main memory.

* * * * *